Patented Feb. 14, 1950

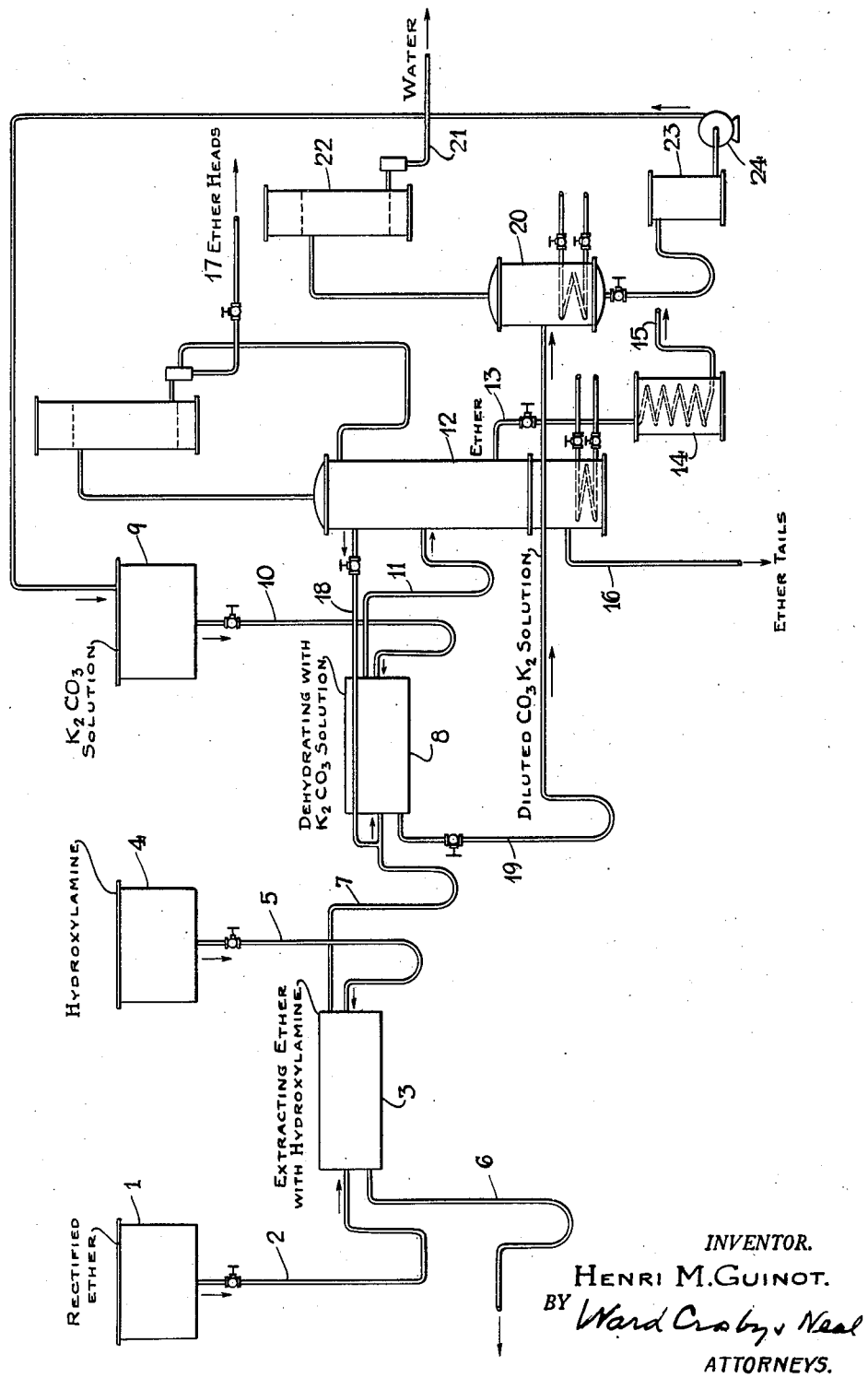

2,497,601

UNITED STATES PATENT OFFICE 2,497,601

PURIFICATION OF ETHER

Henri M. Guinot, Versailles, France, assignor to Les Usines de Melle (Société Anonyme), Saint-Léger-les-Melle, France, a company of France Application March 8, 1947, Serial No. 733,416
In France March 30, 1943

Section 1, Public Law 690, August 8, 1946
Patent expires March 30, 1963

6 Claims. (Cl. 260—616)

It is known that ether for use as an anaesthetic should comply with extremely severe conditions of purity and must be subjected to a number of preliminary tests with a view to ascertaining absence of certain impurities: water, aldehydes, peroxides, ethylenic products, acids. Only that ether which gives definitely negative results upon performance of such tests, is acknowledged as suitable for this special purpose.

Peroxides likely to cause undesirable by-reactions on the human organism must be avoided with quite particular care. Various methods for removing impurities, especially peroxides, have been proposed but none of them gives thorough satisfaction, as peroxides have a tendency to be formed again more or less rapidly in the ether from which such peroxides have been removed, with concomitant production of aldehydes, whatever may be the purification method resorted to.

The mechanism of formation of peroxides in ether has not been cleared up as yet with certainty. A plurality of theories have been proposed but up to this time none of them has met with general approval. On the contrary, all research workers agree to the fact that aldehydes, particularly acetaldehyde, of which traces are mostly found in commercial ether, play an essential part in peroxidation of ether, during which they appear to facilitate oxidation. It being borne in mind that acetaldehyde is found among the decomposition products of peroxide, it will be realized that the latter can be formed again indefinitely, whatever may be the care exercised to remove such peroxide.

Starting from this fact, I have conceived a method having as a primary object thoroughly to remove aldehydes and peroxides, if any, in ether to be treated, so as to obtain an anaesthetic ether of entirely satisfactory purity and which will keep well on storage.

According to this invention, starting from previously rectified ether, i. e. ether possessing a fairly high degree of purity, I treat it with hydroxylamine so as to remove aldehydes to the utmost traces according to a reaction $$NH_2OH + RCHO \rightarrow RCH\!-\!NOH + H_2O$$

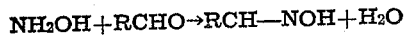

which although well known per se has not been employed in the purification of ether so far as I am aware.

Hydroxylamine may be use as the commercial hydrochloride. However by reason of the relatively high cost of the latter reagent, it is possible, in accordance with a discovery made by me, to employ a raw mixture produced by reacting sulphur dioxide with sodium nitrite in the presence of sodium carbonate; the mixture besides hydroxylamine sulphate which is the active product, also contains sodium sulphate and bisulphate.

In any case, ether thoroughly freed from aldehyde is then approximately dehydrated, for instance by means of a concentrated solution of potassium carbonate, then rectified carefully with withdrawal of head and tail products; during rectification the last traces of water are removed as an azeotropic mixture water-ether having a minimum boiling point and containing 1.3 per cent of water.

In order to show how my invention may be carried out, I will refer to the appended drawing given solely by way of example and illustrating in a diagrammatic fashion an apparatus useful for carrying out said method.

Rectified ether contained in vessel 1 is passed through pipe 2 into a device 3 wherein it is treated with aqueous hydroxylamine solution; device 3 may be a simple vat provided with stirring means or a counter-current washing column, the device being appended to a decanter. However it may be advantageous to employ a small extraction battery of any type comprising 2 or 3 extraction units. Whatever the case may be, ether is treated in device 3 by aqueous hydroxylamine salt solution fed from vessel 4 at an adjustable rate through pipe 5. In actual practice, I use 0.6 molecule of hydroxylamine salt for 100 litres of final anaesthetic ether. The hydroxylamine solution issuing from device 3 through pipe 6 may be subjected to distillation for recovering small amounts of ether dissolved therein.

Ether thoroughly freed from aldehydes leaves device 3 through pipe 7 and enters a dehydrating device 8 identical with device 3 where it is treated with a concentrated solution of potassium carbonate supplied from vessel 9 at an adjustable rate through pipe 10. Purified and partly dehydrated ether is then conveyed through pipe 11 into the middle portion of a column 12; from the lower part of column 12, anaesthetic ether is withdrawn through pipe 13 at any desired rate. After cooling at 14, anaesthetic ether is withdrawn at 15. From the bottom of column 12 anaesthetic ether tail products consisting of ether with traces of high boiling substances such as alcohol which may be present in the starting material are withdrawn through pipe 16. Likewise, from the top of column 12, I withdraw at 17, after condensation, ether possibly admixed with traces of volatile substances for instance traces of ethylene constituting anaesthetic ether head products. Finally with a view to removing ultimate traces of water, I withdraw through pipe 18, at any desired rate, a product which is an ether-water azeotrope and is sent back to pipe 7 which leads it to device 8.

As to the potassium carbonate solution which has been used for treating ether in the device 8, it is led through pipe 19 into a boiler 20 to be brought to a desired concentration. Water is discarded at 21 after condensation at 22 while concentrated carbonate solution flows into vessel 23 where it is taken up by pump 24 and sent back to vessel 9.

In actual practice it is advantageous directly to annex the above described purifying device to an ether producing apparatus, which preferably works under an atmosphere of inert gas such as nitrogen in order that ether supplied to my purifying device is as free from peroxides as possible.

Although my method is quite useful for manfacture of anaesthetic ether, it is likewise applicable to treatment of ethers other than sulphuric ether.

What I claim is:

1. A method for the manufacture of pure ether, which comprises contacting rectified ether with a substance containing hydroxylamine to form an aqueous solution of aldehyde and hydroxylamine and separating the aqueous solution from said rectified ether, then contacting the ether thus freed from aldehydes with a dehydrating substance partly to dehydrate it, introducing the partly dehydrated ether into the middle part of a rectification zone, withdrawing head and tail products from the top and bottom of said zone respectively, and withdrawing pure ether from the rectification zone at a point intermediate the hydrated ether feed point and the bottom of said zone.

2. A process for purifying ether which comprises, reacting ether containing aldehyde with a substance selected from the group consisting of hydroxylamine and water-soluble salts thereof to form a solution of aldehyde-hydroxylamine reaction product and separating the purified ether from the reaction product.

3. A process for purifying ether which comprises, agitating ether in liquid form with an aqueous solution of a substance selected from the group consisting of hydroxylamine and water-soluble salts thereof to form an aqueous solution of aldehyde-hydroxylamine reaction product and separating the purified ether from the reaction product.

4. A process for purifying ether which comprises, reacting ether containing aldehyde with a substance selected from the group consisting of hydroxylamine and water-soluble salts thereof to form a solution of aldehyde-hydroxylamine reaction product, separating the purified ether from the reaction product, and contacting the ether from which aldehyde has been removed with a dehydrating substance to remove water therefrom.

5. The method of claim 4 in which the dehydrating substance is a concentrated aqueous solution of potassium carbonate.

6. A process for purifying ether which comprises, reacting ether containing aldehyde with a reaction product of sulfur dioxide, sodium nitrite and sodium carbonate to form an aqueous solution of aldehyde combined with the reaction product, and separating the purified ether from the solution.

HENRI M. GUINOT.

REFERENCES CITED

The following references are of record in the file of this patent:

UNITED STATES PATENTS

| Number | Name | Date |
|---|---|---|
| 1,466,435 | Hammond | Aug. 28, 1923 |
| 1,536,544 | Willkie | May 5, 1925 |
| 2,099,475 | Giesen et al. | Nov. 16, 1937 |
| 2,121,019 | Christiansen et al. | June 21, 1938 |
| 2,161,808 | Finlayson et al. | June 13, 1939 |

FOREIGN PATENTS

| Number | Country | Date |
|---|---|---|
| 692,412 | Germany | May 23, 1940 |